US012743878B2

(12) United States Patent
Wang et al.

(10) Patent No.: US 12,743,878 B2
(45) Date of Patent: Sep. 22, 2026

(54) TARGET IDENTIFICATION METHOD, DEVICE AND COMPUTER-READABLE STORAGE MEDIUM

(71) Applicant: UBTECH ROBOTICS CORP LTD, Shenzhen (CN)

(72) Inventors: Kan Wang, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 262 days.

(21) Appl. No.: 18/536,287

(22) Filed: Dec. 12, 2023

(65) Prior Publication Data

US 2024/0193929 A1 Jun. 13, 2024

(30) Foreign Application Priority Data

Dec. 12, 2022 (CN) ........................ 202211597641.0

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01); *G06V 2201/07* (2022.01)

(58) Field of Classification Search
CPC . G06V 10/82; G06V 10/7715; G06V 2201/07
See application file for complete search history.

(56) References Cited

U.S. PATENT DOCUMENTS

2011/0255748 A1* 10/2011 Komoto ................. G06V 40/20 382/103
2021/0357679 A1* 11/2021 Bondugula ....... G06F 18/23213
2022/0076138 A1* 3/2022 Kohita ................... G06N 20/00

FOREIGN PATENT DOCUMENTS

CN 110321965 A 10/2019

* cited by examiner

*Primary Examiner* — David F Dunphy

(57) ABSTRACT

A target identification method includes: obtaining an image containing a target to be identified, performing feature extraction on the image to obtain image features in the image; and inputting the image features into a target identification network model to obtain an identification result that determines a class to which the target to be identified belongs. The target identification network model includes a loss function that is based on intra-class constraints and inter-class constraints. The intra-class constraints are to constrain an intra-class distance between sample image features of a sample target and a class center of a class to which the sample target belongs, and the inter-class constraints are to constrain inter-class distances between class centers of different classes, and/or inter-class angles between the class centers of different classes.

18 Claims, 3 Drawing Sheets

TARGET IDENTIFICATION METHOD, DEVICE AND COMPUTER-READABLE STORAGE MEDIUM

CROSS REFERENCE TO RELATED APPLICATIONS

This application claims priority to Chinese Patent Application No. CN 202211597641.0, filed Dec. 12, 2022, which is hereby incorporated by reference herein as if set forth in its entirety

TECHNICAL FIELD

The present disclosure generally relates to image-based identification technology, and in particular relates to a target identification method, device and computer-readable storage medium.

BACKGROUND

Target identification is an important application field of computer vision technology. Generally, network models based on deep learning are often used to achieve target identification. The loss function is one of the important parts of the network model. The network models usually take data as input and performs model training by minimizing the loss function. The aim is to minimize the error between the predicted values by the network models and the actual values corresponding to the data, thereby optimizing the network model.

In related technologies, a center loss function is usually used for model training, and the center loss function can optimize intra-class distances. However, in practical applications, it has been found that models trained using the center loss function often have insufficient robustness when performing target identification.

Therefore, there is a need to provide a target identification method to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
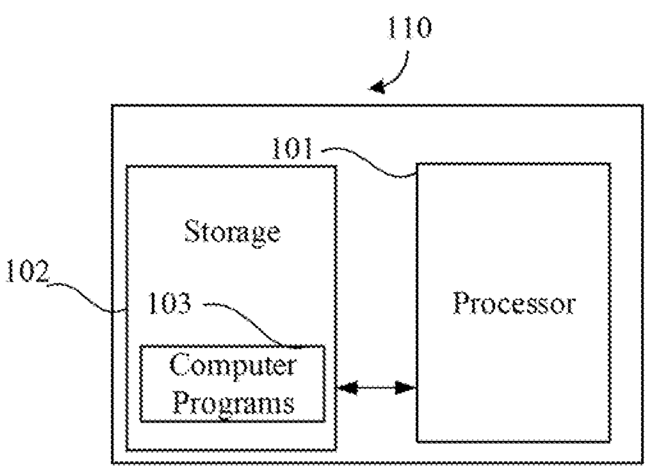
FIG. 1 is a schematic block diagram of a device according to one embodiment.

The disclosure is illustrated by way of example and not by way of limitation in the figures of the accompanying drawings, in which like reference numerals indicate similar elements. It should be noted that references to “an” or “one” embodiment in this disclosure are not necessarily to the same embodiment, and such references can mean “at least one” embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

In related technologies, a center loss function is usually used for model training. Model training using the center loss function mainly consists of the following steps. First, initialization is performed on class centers. Specifically, the class centers $\{C_1, C_2, \ldots, C_K\}$ of all of the classes in the identification task are initialized, where K represents the total number of classes in the identification task, and $C_K$ represents the class center of the K-th class. Then, image features are extracted. Specifically, for sample images $\{I_1, I_2, \ldots, I_N\}$, their image features $\{f_1, f_2, \ldots, f_N\}$ are extracted, respectively, where N represents the total number of sample images, $I_N$ represents the N-th sample image, and $f_N$ represents the image features of the N-th sample image. Then, center loss is applied for network model training. Specifically, for each sample image, its features are constrained to be close to the class center $$L_{center} = \frac{1}{N}\sum_{i=1}^{i=N} D(f_i, C^i)$$

corresponding to the image, where $L_{center}$ is the center loss function, $C^i$ represents the class center corresponding to the i-th image, $D(f_i, C^i)$ represents the distance between $f_i$ and $C^i$. During the network model training process, the class centers are optimized along with the optimization of the network model, and finally a stable state is reached.

It can be seen from the aforementioned center loss function $L_{center}$ that the center loss function $L_{center}$ only constrains the image features of each sample image to be close to the class center of the class to which the sample image belongs, but does not impose any constraints on the class centers of different classes. Therefore, the center loss function only optimizes the intra-class distances, making the image features within the same class more compact, but does not optimize the relative relationship between classes. This will reduce the robustness and generalization of the features extracted by the network model. That is, the model trained based on the center loss function often has insufficient robustness and generalization when performing target identification.

In view of this, this present disclosure proposes a new target identification method, which optimizes the loss function of the network model, so that the network model trained based on the optimized loss function can achieve target identification more robustly. In order to illustrate the technical solution of the present disclosure, specific embodiments are provided below.

Figure 2:
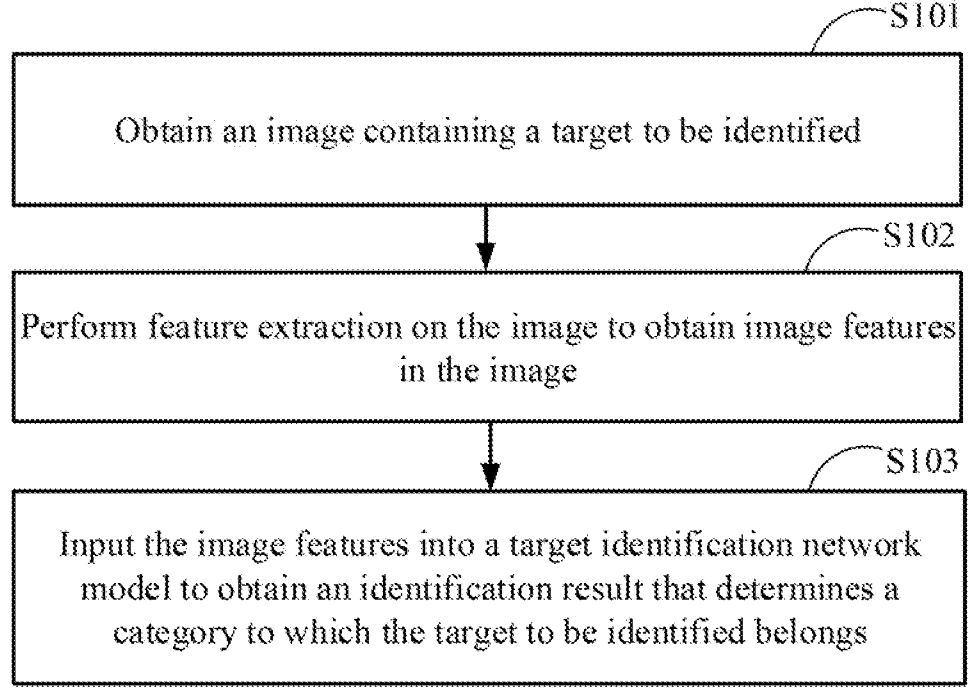
FIG. 2 is an exemplary flowchart of a target identification method according to one embodiment.

FIG. 1 shows a schematic block diagram of a device 110 according to one embodiment. The device 110 may include a processor 101, a storage 102, and one or more executable computer programs 103 that are stored in the storage 102. The storage 102 and the processor 101 are directly or indirectly electrically connected to each other to realize data transmission or interaction. For example, they can be electrically connected to each other through one or more communication buses or signal lines. The processor 101 performs corresponding operations by executing the executable computer programs 103 stored in the storage 102. When the processor 101 executes the computer programs 103, the steps in the embodiments of a target identification method, such as steps S101 to S103 in FIG. 2 are implemented.

The processor 101 may be an integrated circuit chip with signal processing capability. The processor 101 may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor 101 can implement or execute the methods, steps, and logical blocks disclosed in the embodiments of the present disclosure.

The storage 102 may be, but not limited to, a random-access memory (RAM), a read only memory (ROM), a programmable read only memory (PROM), an erasable programmable read-only memory (EPROM), and an electrical erasable programmable read-only memory (EEPROM). The storage 102 may be an internal storage unit of the device 110, such as a hard disk or a memory. The storage 102 may also be an external storage device of the device 110, such as a plug-in hard disk, a smart memory card (SMC), and a secure digital (SD) card, or any suitable flash cards. Furthermore, the storage 102 may also include both an internal storage unit and an external storage device. The storage 102 is to store computer programs, other programs, and data required by the device 110. The storage 102 can also be used to temporarily store data that have been output or is about to be output.

Figure 3:
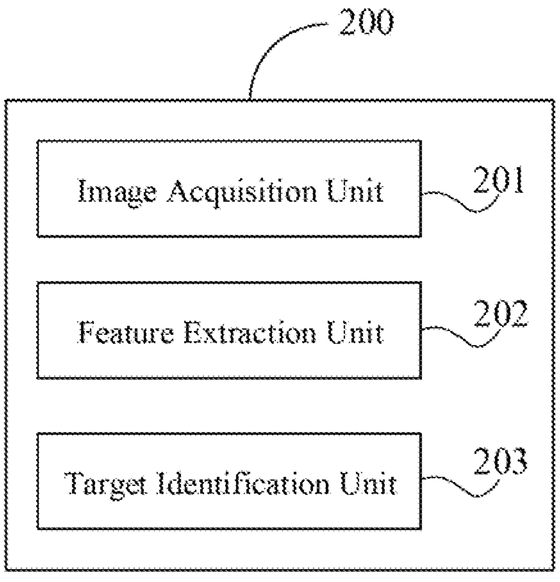
FIG. 3 is a schematic block diagram of a target identification device according to one embodiment.

Exemplarily, the one or more computer programs 103 may be divided into one or more modules/units, and the one or more modules/units are stored in the storage 102 and executable by the processor 101. The one or more modules/units may be a series of computer program instruction segments capable of performing specific functions, and the instruction segments are used to describe the execution process of the one or more computer programs 103 in the device 110. For example, the one or more computer programs 103 may be divided into an image acquisition unit 201, a feature extraction unit 202 and a target identification unit 203 as shown in FIG. 3.

It should be noted that the block diagram shown in FIG. 1 is only an example of the device 110. The device 110 may include more or fewer components than what is shown in FIG. 1, or have a different configuration than what is shown in FIG. 1. Each component shown in FIG. 1 may be implemented in hardware, software, or a combination thereof.

FIG. 2 is an exemplary flowchart of a target identification method according to one embodiment. As an example, but not a limitation, the method can be implemented by the device 110 and is suitable for situations where the accuracy of target identification needs to be improved. The device 110 can be a smartphone, a computer, a vehicle-mounted equipment, a monitoring equipment, or an intelligent device with a need for target identification. The method may include the following steps.

Step S101: Obtain an image containing a target to be identified.

The aforementioned target to be identified refers to the object requiring identification, and the image is obtained by capturing the target to be identified. It should be understood that the target to be identified can be a person, a vehicle, a pet, or any other object, and can be adjusted based on the requirements of the identification task.

In one embodiment, the device 110 can obtain the image in different manners. For example, the device 110 can photograph the target to be identified through a camera to obtain the image. Alternatively, the device 110 can download the image that needs to be identified from the Internet. The present disclosure does not impose any restrictions on this aspect.

Step S102: Perform feature extraction on the image to obtain image features in the image.

Image features refer to characteristics within the image, which can include various types of information such as pixel values, contours, textures, and other distinguishing elements present in the image. They can further include features of the target to be identified in the image, such as key feature points of the target to be identified.

It should be noted that the present disclosure does not impose restrictions on the method used for extracting image features. The device can employ various algorithms to extract image features from the image, such as the local binary patterns (LBP) feature extraction algorithm, histogram of oriented gradient (HOG) feature extraction algorithm, scale-invariant feature transform (SIFT) algorithm for keypoint extraction, feature extraction algorithms based on deep neural networks (e.g., ResNet), or other algorithms for extracting image features.

Step S103: Input the image features into a target identification network model to obtain an identification result that determines a class to which the target to be identified belongs.

In one embodiment, the target identification network model includes a loss function that is based on intra-class constraints and inter-class constraints.

The intra-class constraints are to constrain an intra-class distance between sample image features of a sample target and a class center of a class to which the sample target belongs. Intra-class distances can represent the distances between sample image features within the same class. Model training based on intra-class constraints can constrain the sample image features of each sample image to be close to the class center of the class to which the sample image belongs.

The inter-class constraints are to constrain inter-class distances between class centers of different classes, and/or inter-class angles between the class centers of different classes. The inter-class distances can represent the distances between the class centers of different classes, and the inter-class angles can represent the angles between the class centers of different classes. Model training based on inter-class constraints can constrain the class centers of different classes to be separated from each other. It should be noted that since the sample image features are feature vectors, the obtained class centers are actually also a vector.

More specifically, the loss value of the loss function is positively correlated with the intra-class distances, negatively correlated with the inter-class distances, and is negatively correlated with the angles between the class centers of different classes.

The target identification network model is a network model that has been trained and used to identify image features. The sample images may be images used for model training. The sample image features are image features extracted from the sample images, and sample targets refer to the targets in the sample images. The class center of a certain class can be the mean of all of the sample image features of the class. The method of obtaining the sample images and the method of extracting the features of the sample image scan refer to the description in relation to the image and image features above, which will not be described in detail here.

In summary, by performing feature extraction on the image containing the target to be identified, the image features in the image are obtained. The image features are input into a target identification network model to obtain an identification result that determines a class to which the target to be identified belongs. The target identification network model includes a loss function that is based on intra-class constraints and inter-class constraints. The intra-class constraints are to constrain an intra-class distance between sample image features of a sample target and a class center of a class to which the sample target belongs. The inter-class constraints are to constrain inter-class distances between class centers of different classes, and/or inter-class angles between the class centers of different classes. That is, during the model training process, while constraining the intra-class distances, the inter-class distances and/or the inter-class angles can be constrained for the class centers of different classes, and the relative relationship between different classes are optimized, which enables the model to better identify the differences between different classes, thereby improving the robustness and generalization of target identification.

In one embodiment, the inter-class constraints may include orthogonal constraints and/or inter-class constraints. The orthogonal constraints can be used to constrain the inter-class angles between the class centers of different classes, which can increase the difference in direction between the class centers of different classes. In one embodiment, the orthogonal constraints are expressed as follows:

$$L_1 = \frac{2}{K(K-1)}\sum\nolimits_{1<=i,j<=k;i\neq j}\left\{\frac{C_iC_j}{\|C_i\|\|C_j\|}\right\}_+,$$

where $L_1$ represents a sub-function corresponding to the orthogonal constraints in the loss function, the sub-function is part of the loss function; K represents the total number of the classes; $C_i$ represents the class center of the i-th class; $C_j$ represents the class center of the j-th class; $\|\ \|$ represents a norm, $\|C_i\|$ represents the norm of $C_i$; and $\{x\}_+$ represents the maximum value between x and 0, that is, $\{x\}_+=\max\{x, 0\}$.

From the equation above, it's evident that when the angle between $C_i$ and $C_j$ (i.e., the inter-class angle) is larger, the value of the sub-function corresponding to the orthogonal constraints becomes smaller. In the process of training the network model, in order to minimize the loss function, it needs to optimize in the direction of increasing the angle between $C_i$ and $C_j$.

Metric constraints can be used to constrain the inter-class distances between class centers of different classes, which can increase the difference in distance between class centers of different classes. In one embodiment, the metric constraints are expressed as follows:

$$L_2 = \frac{2}{K(K-1)}\sum\nolimits_{1<=i,j<=k;i\neq j}\{\alpha - D(C_i, C_j)\}_+,$$

where $L_2$ represents a sub-function corresponding to the metric constraints in the loss function, K represents the total number of the classes, $C_i$ represents the class center of the i-th class, Cj represents the class center of the j-th class, $\{x\}_+$ represents the maximum value between x and 0, that is, $\{x\}_+=\max\{x, 0\}$, $D(C_i, C_j)$ represents a distance between $C_i$ and C, $D(C_i, C_j)$ can be obtained by subtracting $C_i$ from $C_j$, a is a preset distance threshold, $\alpha>0$ and its value can be adjusted based on the actual circumstances.

From the equation above, as the distance between $C_i$ and $C_j$ (i.e., inter-class distance) increases, the function value of the sub-function corresponding to the metric constraints is smaller. During the training process of the network model, to minimize the loss function, it's essential to ensure that the distance $D(C_i, C_j)$ between two class centers is greater than the distance threshold a. This means optimizing towards increasing the distance between $C_i$ and $C_j$.

In one embodiment, the intra-class constraints can be expressed as follows:

$$\frac{1}{N}\sum\nolimits_{p=1}^{p=N} D(f_p, C^p),$$

where N represents the total number of sample images, $f_p$ represents sample image features of the p-th sample image, $C^p$ represents the class center of the class to which the sample target of the p-th sample image belongs, and $D(f_p, C^p)$ represents a distance between $f_p$ and $C^p$.

In one embodiment, the loss function can be expressed as follows:

$$L_{center} = \frac{1}{N}\sum\nolimits_{p=1}^{p=N} D(f_p, C^p) + \frac{2}{K(K-1)}\sum\nolimits_{1<=i,j<=k;i\neq j}\left\{\left\{\frac{C_iC_j}{\|C_i\|\|C_j\|}\right\}_+ + \{\alpha - D(C_i, C_j)\}_+.\right.$$

Based on this loss function, the device 110 can obtain the sample images of sample targets. With the goal of minimizing the loss function, the sample images are used to iteratively train the identification network model to be trained until the loss value of the loss function is less than or equal to the preset loss value threshold, or until the number of iterations of the identification network model to be trained is greater than or equal to a preset threshold, thereby obtaining the target identification network model. During the model training process, it needs to iteratively update the class center of the class to which the sample target belongs.

Specifically, for the sample images $\{I_1, I_2, \ldots, I_p\}$, the image features $\{f_1, f_2, \ldots, f_p\}$ are extracted respectively. Here p represents the total number of sample images, $I_p$ represents the p-th sample image, and $f_p$ represents the sample image features of the p-th sample image. Several images are selected from the sample images to form a batch, the sample images of this batch are input into the identification network model to be trained to obtain their predicted values. The predicted values and the true values of the sample images are used to calculate the loss value of the loss function $L_{center}$. If the convergence condition of the identification network model to be trained is that the loss value is less than or equal to the loss value threshold, the model parameters of the identification network model to be trained are adjusted when the loss value is greater than the loss value threshold. The class center of the class to which the sample target belongs is updated based on the sample image features corresponding to the sample target in the process. Then, a new batch of sample images is input into the identification network model to be trained until the loss value is less than or equal to the loss value threshold, thereby obtaining the target identification network model. If the convergence condition of the identification network model to be trained is that the number of iterations is greater than or equal to a preset threshold, the model parameters of the identification network model to be trained are adjusted when the number of iterations is less than the preset threshold. The class center of the class to which the sample target belongs is updated based on the sample image features corresponding to the sample target in the process. Then, a new batch of sample images is input into the identification network model to be trained until the number of iterations is greater than or equal to the preset threshold, thereby obtaining the target identification network model. Both the preset threshold and the loss value threshold can be adjusted according to actual situations.

After obtaining the target identification network model, the device 110 can use it to perform target identification. This target identification method can be applied to fields such as person re-identification and vehicle identification, which is not limited by the present disclosure.

The target identification method proposed in the present disclosure uses a center loss function based on orthogonal constraints and metric constraints, which can improve the shortcomings of the traditional center loss functions that cannot optimize the differences between classes, and allows the center loss function to more effectively increase inter-class distances and reduce intra-class distances, thereby improving the robustness and generalization of target identification.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 3, in one embodiment, a target identification device 200 may include an image acquisition unit 201, a feature extraction unit 202 and a target identification unit 203. The image acquisition unit 201 is to obtain an image containing a target to be identified. The feature extraction unit 202 is to perform feature extraction on the image to obtain image features in the image. The target identification unit 203 is to input the image features into a target identification network model to obtain an identification result that determines a class to which the target to be identified belongs. The target identification network model includes a loss function that is based on intra-class constraints and inter-class constraints. The intra-class constraints are to constrain an intra-class distance between sample image features of a sample target and a class center of a class to which the sample target belongs, and the inter-class constraints are to constrain inter-class distances between class centers of different classes, and/or inter-class angles between the class centers of different classes.

In one embodiment, the inter-class constraints include orthogonal constraints that are to constrain the inter-class angles, and the orthogonal constraints are expressed as follows:

$$L_1 = \frac{2}{K(K-1)}\sum\nolimits_{1<=i,j<=k;i\neq j}\left\{\frac{C_iC_j}{\|C_i\|\|C_j\|}\right\}_+,$$

where $L_1$ represents a sub-function corresponding to the orthogonal constraints in the loss function, K represents a total number of the classes, $C_i$ represents the class center of an i-th class, $C_i$ represents the class center of a j-th class, $\|\ \|$ represents a norm, and $\{x\}_+$ represents the maximum value between x and 0.

In one embodiment, the inter-class constraints include metric constraints for constraining the inter-class distances, and the metric constraints are expressed as follows:

$$L_2 = \frac{2}{K(K-1)}\sum\nolimits_{1<=i,j<=K;i\neq j}\{\alpha - D(C_i, C_j)\}_+,$$

where $L_2$ represents a sub-function corresponding to the metric constraints in the loss function, K represents a total number of the classes, $C_i$ represents the class center of an i-th class, $C_i$ represents the class center of a j-th class, $\alpha$ is a preset distance threshold, $\{x\}_+$ represents the maximum value between x and 0, $D(C_i, C_j)$ represents a distance between $C_i$ and $C_j$.

In one embodiment, the intra-class constraints are expressed as follows:

$$\frac{1}{N}\sum\nolimits_{p=1}^{p=N} D(f_p, C^p),$$

where N represents a total number of sample images, $f_p$ represents sample image features of a p-th sample image, $C^p$ represents the class center of the class to which the sample target of the p-th sample image belongs, and $D(f_p, C^p)$ represents a distance between $f_p$ and $C^p$.

In one embodiment, the loss function is expressed as follows:

$$L_{center} = \frac{1}{N}\sum\nolimits_{p=1}^{p=N} D(f_p, C^p) + \frac{2}{K(K-1)}\sum\nolimits_{1<=i,j<=K;i\neq j}\left\{\left\{\frac{C_iC_j}{\|C_i\|\|C_j\|}\right\}_+ + \{\alpha - D(C_i, C_j)\}_+\right\},$$

where N represents a total number of sample images, $f_p$ represents sample image features of a p-th sample image, $C^p$ represents the class center of the class to which the sample target of the p-th sample image belongs, $D(f_p, C^p)$ represents a distance between $f_p$ and $C^p$, K represents a total number of the classes, $C_i$ represents the class center of an i-th class, $C_i$ represents the class center of a j-th class, $\|\ \|$ represents a norm, $\{x\}_+$ represents the maximum value between x and 0, $\alpha$ is a preset distance threshold, and $D(C_i, C_j)$ represents a distance between $C_i$ and $C_j$.

In one embodiment, the target identification device 200 may further include a model training unit that is to: obtain a plurality of sample images of the sample target; and with a goal of minimizing the loss function, train a to-be-trained identification network model iteratively using the sample images until the loss value of the loss function is less than or equal to a preset loss value threshold, or until a number of iterations of the identification network model to be trained is greater than or equal to a preset threshold, thereby obtaining the target identification network model.

In one embodiment, the model training unit is to iteratively update the class center of the class to which the sample target belongs.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in the present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented target identification method, the method comprising:

obtaining an image containing a target to be identified;

performing feature extraction on the image to obtain image features in the image; and inputting the image features into a target identification network model to obtain an identification result that determines a class to which the target to be identified belongs, wherein the target identification network model comprises a loss function that is based on intra-class constraints and inter-class constraints, wherein the intra-class constraints are configured to constrain an intra-class distance between sample image features of a sample target and a class center of a class to which the sample target belongs, and wherein the inter-class constraints are configured to constrain inter-class distances between class centers of different classes, and inter-class angles between the class centers of different classes, or the inter-class constraints are configured to constrain the inter-class angles;

wherein the inter-class constraints comprise orthogonal constraints that are configured to constrain the inter-class angles, and the orthogonal constraints are expressed as follows:

$$L_1 = \frac{2}{K(K-1)} \sum\nolimits_{1<=i,j<=K;i\neq j} \left\{ \frac{C_i C_j}{\|C_i\| \|C_j\|} \right\}_+,$$

where $L_1$ represents a sub-function corresponding to the orthogonal constraints in the loss function, K represents a total number of the classes, $C_i$ represents the class center of an i-th class, $C_j$ represents the class center of a j-th class, $\| \|$ represents a norm, and $\{x\}_+$ represents the maximum value between x and 0.

2. The method of claim 1, wherein the inter-class constraints comprise metric constraints for constraining the inter-class distances, and the metric constraints are expressed as follows:

$$L_2 = \frac{2}{K(K-1)} \sum\nolimits_{1<=i,j<=K;i\neq j} \{\alpha - D(C_i, C_j)\}_+,$$

where $L_2$ represents a sub-function corresponding to the metric constraints in the loss function, K represents the total number of the classes, $C_i$ represents the class center of the i-th class, $C_j$ represents the class center of the j-th class, $\alpha$ is a preset distance threshold, $\{x\}_+$ represents the maximum value between x and 0, $D(C_i, C_j)$ represents a distance between $C_i$ and $C_j$.

3. The method of claim 1, wherein the intra-class constraints are expressed as follows:

$$\frac{1}{N} \sum\nolimits_{p=1}^{p=N} D(f_p, C^p),$$

where N represents a total number of sample images, $f_p$ represents sample image features of a p-th sample image, $C^p$ represents the class center of the class to which the sample target of the p-th sample image belongs, and $D(f_p, C^p)$ represents a distance between $f_p$ and $C^p$.

4. The method of claim 1, wherein the loss function is expressed as follows:

$$L_{center} = \frac{1}{N} \sum\nolimits_{p=1}^{p=N} D(f_p, C^p) + \frac{2}{K(K-1)} \sum\nolimits_{1<=i,j<=K;i\neq j} \left\{ \left\{ \frac{C_i C_j}{\|C_i\| \|C_j\|} \right\}_+ + \{\alpha - D(C_i, C_j)\}_+ \right\},$$

where N represents a total number of sample images, $f_p$ represents sample image features of a p-th sample image, $C^p$ represents the class center of the class to which the sample target of the p-th sample image belongs, $D(f_p, C^p)$ represents a distance between $f_p$ and $C^p$, K represents a total number of the classes, $C_i$ represents the class center of an i-th class, $C_j$ represents the class center of a j-th class, $\| \|$ represents a norm, $\{x\}_+$ represents the maximum value between x and 0, $\alpha$ is a preset distance threshold, and $D(C_i, C_j)$ represents a distance between $C_i$ and $C_j$.

5. The method of claim 1, wherein a process of training the target identification network model comprises:

obtaining a plurality of sample images of the sample target; and with a goal of minimizing the loss function, training a to-be-trained identification network model iteratively using the sample images until the loss value of the loss function is less than or equal to a preset loss value threshold, or until a number of iterations of the identification network model to be trained is greater than or equal to a preset threshold, thereby obtaining the target identification network model.

6. The method of claim 5, wherein training the to-be-trained identification network model iteratively using the sample images comprises:

iteratively updating the class center of the class to which the sample target belongs.

7. The method of claim 1, wherein a loss value of the loss function is positively correlated with the intra-class distance and negatively correlated with the inter-class distances, and is negatively correlated with inter-class angles between the class centers of different classes.

8. A device comprising:

one or more processors; and a memory coupled to the one or more processors, the memory storing programs that, when executed by the one or more processors, cause performance of operations comprising:

obtaining an image containing a target to be identified;

performing feature extraction on the image to obtain image features in the image; and inputting the image features into a target identification network model to obtain an identification result that determines a class to which the target to be identified belongs, wherein the target identification network model comprises a loss function that is based on intra-class constraints and inter-class constraints, wherein the intra-class constraints are configured to constrain an intra-class distance between sample image features of a sample target and a class center of a class to which the sample target belongs, and wherein the inter-class constraints are configured to constrain inter-class distances between class centers of different classes, and inter-class angles between the class centers of different classes, or the inter-class constraints are configured to constrain the inter-class angles;

wherein the inter-class constraints comprise metric constraints for constraining the inter-class distances, and the metric constraints as e expressed as follows:

$$L_2 = \frac{2}{K(K-1)} \sum_{1<=i,j<=K;i\neq j} \{\alpha - D(C_i, C_j)\}_+,$$

where $L_2$ represents a sub-function corresponding to the metric constraints in the loss function, K represents a total number of the classes, $C_i$ represents the class center of an i-th class, $C_j$ represents the class center of a j-th class, $\alpha$ is a preset distance threshold, $\{x\}_+$ represents the maximum value between x and 0, $D(C_i, C_j)$ represents a distance between $C_i$ and $C_j$.

9. The device of claim 8, wherein the inter-class constraints comprise orthogonal constraints that are configured to constrain the inter-class angles, and the orthogonal constraints are expressed as follows:

$$L_1 = \frac{2}{K(K-1)} \sum_{1<=i,j<=K;i\neq j} \left\{\frac{C_i C_j}{\|C_i\|\|C_j\|}\right\}_+,$$

where $L_1$ represents a sub-function corresponding to the orthogonal constraints in the loss function, K represents the total number of the classes, $C_i$ represents the class center of the i-th class, $C_j$ represents the class center of the j-th class, $\| \|$ represents a norm, and $\{x\}_+$ represents the maximum value between x and 0.

10. The device of claim 8, wherein the intra-class constraints are expressed as follows:

$$\frac{1}{N} \sum_{p=1}^{p=N} D(f_p, C^p),$$

where N represents a total number of sample images, $f_p$ represents sample image features of a p-th sample image, $C^p$ represents the class center of the class to which the sample target of the p-th sample image belongs, and $D(f_p, C^p)$ represents a distance between $f_p$ and $C^p$.

11. The device of claim 8, wherein the loss function is expressed as follows:

$$L_{center} = \frac{1}{N} \sum_{p=1}^{p=N} D(f_p, C^p) + \frac{2}{K(K-1)} \sum_{1<=i,j<=K;i\neq j} \left\{\left\{\frac{C_i C_j}{\|C_i\|\|C_j\|}\right\}_+ + \{\alpha - D(C_i, C_j)\}_+\right\},$$

where N represents a total number of sample images, $f_p$ represents sample image features of a p-th sample image, $C^p$ represents the class center of the class to which the sample target of the p-th sample image belongs, $D(f_p, C^p)$ represents a distance between $f_p$ and $C^p$, K represents a total number of the classes, $C_i$ represents the class center of an i-th class, $C_j$ represents the class center of a j-th class, $\| \|$ represents a norm, $\{x\}_+$ represents the maximum value between x and 0, $\alpha$ is a preset distance threshold, and $D(C_i, C_j)$ represents a distance between $C_i$ and $C_j$.

12. The device of claim 8, wherein a process of training the target identification network model comprises:

obtaining a plurality of sample images of the sample target; and with a goal of minimizing the loss function, training a to-be-trained identification network model iteratively using the sample images until the loss value of the loss function is less than or equal to a preset loss value threshold, or until a number of iterations of the identification network model to be trained is greater than or equal to a preset threshold, thereby obtaining the target identification network model.

13. The device of claim 12, wherein training the to-be-trained identification network model iteratively using the sample images comprises:

iteratively updating the class center of the class to which the sample target belongs.

14. A non-transitory computer-readable storage medium storing instructions that, when executed by at least one processor of a device, cause the at least one processor to perform a method, the method comprising:

obtaining an image containing a target to be identified;

performing feature extraction on the image to obtain image features in the image; and inputting the image features into a target identification network model to obtain an identification result that determines a class to which the target to be identified belongs, wherein the target identification network model comprises a loss function that is based on intra-class constraints and inter-class constraints, the intra-class constraints are configured to constrain an intra-class distance between sample image features of a sample target and a class center of a class to which the sample target belongs, and the inter-class constraints are configured to constrain inter-class distances between class centers of different classes, and/or inter-class angles between the class centers of different classes;

wherein the loss function is expressed as follows:

$$L_{center} = \frac{1}{N}\sum_{p=1}^{p=N} D(f_p, C^p) + \frac{2}{K(K-1)}\sum_{1<=i,j<=K;i\neq j}\left\{\left\{\frac{C_i C_j}{\|C_i\|\|C_j\|}\right\}_+ + \{\alpha - D(C_i, C_j)\}_+\right\},$$

where N represents a total number of sample images, $f_p$ represents sample image features of a p-th sample image, $C^p$ represents the class center of the class to which the sample target of the p-th sample image belongs, $D(f_p, C^p)$ represents a distance between $f_p$ and $C^p$, K represents a total number of the classes, $C_i$ represents the class center of an i-th class, $C_j$ represents the class center of a j-th class, $\| \|$ represents a norm, $\{x\}_+$ represents the maximum value between x and 0, $\alpha$ is a preset distance threshold, and $D(C_i, C_j)$ represents a distance between $C_i$ and $C_j$.

15. The non-transitory computer-readable storage medium of claim 14, wherein the inter-class constraints comprise orthogonal constraints that are configured to constrain the inter-class angles, and the orthogonal constraints are expressed as follows:

$$L_1 = \frac{2}{K(K-1)}\sum_{1<=i,j<=K;i\neq j}\left\{\frac{C_i C_j}{\|C_i\|\|C_j\|}\right\}_+,$$

where $L_1$ represents a sub-function corresponding to the orthogonal constraints in the loss function, K represents a total number of the classes, $C_i$ represents the class center of an i-th class, $C_j$ represents the class center of a j-th class, $\| \|$ represents a norm, and $\{x\}_+$ represents the maximum value between x and 0.

16. The non-transitory computer-readable storage medium of claim 14, wherein the inter-class constraints comprise metric constraints for constraining the inter-class distances, and the metric constraints are expressed as follows:

$$L_2 = \frac{2}{K(K-1)}\sum_{1<=i,j<=K;i\neq j}\{\alpha - D(C_i, C_j)\}_+,$$

where $L_2$ represents a sub-function corresponding to the metric constraints in the loss function, K represents a total number of the classes, $C_i$ represents the class center of an i-th class, $C_j$ represents the class center of a j-th class, $\alpha$ is a preset distance threshold, $\{x\}_+$ represents the maximum value between x and 0, $D(C_i, C_j)$ represents a distance between $C_i$ and $C_j$.

17. The non-transitory computer-readable storage medium of claim 14, wherein the intra-class constraints are expressed as follows:

$$\frac{1}{N}\sum_{p=1}^{p=N} D(f_p, C^p),$$

where N represents a total number of sample images, $f_p$ represents sample image features of a p-th sample image, $C^p$ represents the class center of the class to which the sample target of the p-th sample image belongs, and $D(f_p, C^p)$ represents a distance between $f_p$ and $C^p$.

18. The non-transitory computer-readable storage medium of claim 14, wherein a process of training the target identification network model comprises:

obtaining a plurality of sample images of the sample target; and with a goal of minimizing the loss function, training a to-be-trained identification network model iteratively using the sample images until the loss value of the loss function is less than or equal to a preset loss value threshold, or until a number of iterations of the identification network model to be trained is greater than or equal to a preset threshold, thereby obtaining the target identification network model.

* * * * *